US008558816B2

(12) United States Patent
Cho et al.

(10) Patent No.: US 8,558,816 B2
(45) Date of Patent: Oct. 15, 2013

(54) PLASMA DISPLAY DEVICE

(75) Inventors: Yu-Jeong Cho, Suwon-si (KR);
Seong-Gi Choo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 434 days.

(21) Appl. No.: 12/622,846

(22) Filed: Nov. 20, 2009

(65) Prior Publication Data
US 2010/0134445 A1    Jun. 3, 2010

(30) Foreign Application Priority Data

Dec. 1, 2008  (KR) .......................... 10-2008-0120662

(51) Int. Cl.
*G06F 3/042* (2006.01)

(52) U.S. Cl.
USPC .............. 345/175; 345/37; 345/173; 345/174

(58) Field of Classification Search
None
See application file for complete search history.

(56) References Cited

U.S. PATENT DOCUMENTS

| | | | | |
|---|---|---|---|---|
| 3,775,560 | A * | 11/1973 | Ebeling et al. | 178/18.09 |
| 4,782,328 | A | 11/1988 | Denlinger | |
| 5,660,471 | A * | 8/1997 | Yoshiike et al. | 374/124 |
| 6,421,042 | B1 * | 7/2002 | Omura et al. | 345/157 |
| 7,283,128 | B2 * | 10/2007 | Sato | 345/173 |
| 7,619,617 | B2 * | 11/2009 | Morrison et al. | 345/173 |
| 8,093,810 | B2 * | 1/2012 | Yim et al. | 313/582 |
| 8,115,753 | B2 * | 2/2012 | Newton | 345/175 |
| 8,310,411 | B2 * | 11/2012 | Yim | 345/60 |
| 2002/0075243 | A1 * | 6/2002 | Newton | 345/173 |
| 2003/0214498 | A1 * | 11/2003 | Gothard | 345/204 |
| 2004/0149892 | A1 * | 8/2004 | Akitt et al. | 250/221 |
| 2005/0035336 | A1 | 2/2005 | Kuwabara | |
| 2006/0022962 | A1 * | 2/2006 | Morrison et al. | 345/175 |
| 2006/0209047 | A1 | 9/2006 | Jeong | |
| 2006/0232568 | A1 * | 10/2006 | Tanaka et al. | 345/175 |
| 2006/0279548 | A1 | 12/2006 | Geaghan | |

(Continued)

FOREIGN PATENT DOCUMENTS

| CN | 1834881 A | 9/2006 |
|---|---|---|
| CN | 101127175 A | 2/2008 |

(Continued)

OTHER PUBLICATIONS

Search Report dated Mar. 30, 2010, for European Patent Application. 09250500.7.

(Continued)

*Primary Examiner* — Dismery Mercedes
(74) *Attorney, Agent, or Firm* — Christie, Parker & Hale, LLP

(57) ABSTRACT

A plasma display device that enables a reduction of costs in implementing a touch panel function using infrared rays generated when displaying an image, which are emitted in a substantially uniform dispersion from a display area. One embodiment includes a plasma display panel (PDP) for displaying the image and a pair of infrared sensor cameras at two corners of the PDP. The infrared sensor cameras are either on the front or rear side of the PDP, and are utilized to detect changes in the amount of infrared rays emitted from the PDP. A controller determines a position where the amount of infrared rays is changed, which corresponds to a touch position, and transmits a detection signal indicating the location of the change in the amount of infrared rays. The infrared sensor camera has a lens with a view angle in the range of 90° to 180°.

18 Claims, 6 Drawing Sheets

(56) References Cited

U.S. PATENT DOCUMENTS

| | | | |
|---|---|---|---|
| 2007/0188407 A1* | 8/2007 | Nishi | 345/8 |
| 2007/0229250 A1* | 10/2007 | Recker et al. | 340/531 |
| 2009/0044989 A1* | 2/2009 | Sato | 178/18.01 |
| 2009/0066671 A1* | 3/2009 | Kweon et al. | 345/175 |
| 2009/0067040 A1* | 3/2009 | Izumi | 359/356 |
| 2010/0020202 A1* | 1/2010 | Ogawa | 348/240.2 |
| 2010/0164912 A1 | 7/2010 | Soga et al. | |

FOREIGN PATENT DOCUMENTS

| | | |
|---|---|---|
| EP | 1 780 697 A2 | 5/2007 |
| EP | 1780697 A2 | 5/2007 |
| EP | 2 093 652 A2 | 8/2009 |
| JP | 05-160702 | 6/1993 |
| JP | 09-91088 | 4/1997 |
| JP | 09-171173 | 6/1997 |
| JP | 2000-010493 | 1/2000 |
| JP | 2000-098131 | 4/2000 |
| JP | 2001-084058 | 3/2001 |
| JP | 2001-147776 | 5/2001 |
| JP | 2001-175416 | 6/2001 |
| JP | 2002-116428 | 4/2002 |
| JP | 2002-519725 | 7/2002 |
| JP | 2003-099205 | 4/2003 |
| JP | 2006-103364 | 4/2006 |
| JP | 2007-271773 | 10/2007 |
| JP | 2007-316925 | 12/2007 |
| KR | 10-2007-0020431 | 2/2007 |
| KR | 10-2007-0024969 | 3/2007 |
| KR | 10-2007-0082958 | 8/2007 |
| WO | WO 99/39224 A1 | 8/1999 |
| WO | WO 2007/111329 A1 | 10/2007 |

OTHER PUBLICATIONS

KIPO Decision to Grant dated Apr. 12, 2010, for Korean Patent Application. 10-2008-0016713.
Japanese Office action dated Feb. 9, 2010, for Japanese Patent Application. 2008-219482.
SIPO Office action dated Nov. 12, 2010, for Chinese Patent application 200910004440.3, with English translation, noting references previously filed in an IDS dated Oct. 20, 2010.
U.S. Office action dated Dec. 21, 2010 for cross reference U.S. Appl. No. 12/378,345.
SIPO Office action dated Apr. 26, 2011, for Chinese Patent application 200910004440.3, noting references previously submitted in an IDS dated Oct. 20, 2010.
U.S. Office action dated Jun. 7, 2011, for cross-reference U.S. Appl. No. 12/378,345, 15 pages.
U.S. Advisory action dated Aug. 12, 2011, for cross-reference U.S. Appl. No. 12/378,345, 4 pages.
U.S. Notice of Allowance dated Sep. 22, 2011, for cross-reference U.S. Appl. No. 12/378,345, 7 pages.
European Search Report dated Sep. 16, 2010, for corresponding European Patent application 09177239.2, noting listed references in this IDS.
SIPO Office Action dated Aug. 31, 2011 of the corresponding Chinese Patent Application No. 200910246687.6, noting listed references in this IDS.
SIPO Certificate of Patent dated Nov. 14, 2012, for corresponding Chinese Patent application 200910246687.6, (17 pages).
EPO Office action dated May 21, 2013, for corresponding European Patent application 09177239.2, (4 pages).

* cited by examiner

PLASMA DISPLAY DEVICE

CROSS-REFERENCE TO RELATED APPLICATION

This application claims priority to and the benefit of Korean Patent Application No. 10-2008-0120662 filed in the Korean Intellectual Property Office on Dec. 1, 2008, the entire contents of which are incorporated herein by reference.

BACKGROUND OF THE INVENTION

1. Field of the Invention

An aspect of the present invention relates to a plasma display device. More particularly, an aspect of the present invention relates to a plasma display device having a touch panel function.

2. Description of the Related Art

Generally, a plasma display device is a device that displays an image on a plasma display panel (PDP) using plasma generated by gas discharge.

A PDP is a display element that excites a phosphor using vacuum ultraviolet (VUV) rays (VUV: Vacuum Ultra-Violet) emitted from a plasma, and displays an image using red (R), green (G) and blue (B) visible light generated as the phosphor is stabilized.

For example, an AC type PDP includes a front substrate, a rear substrate, address electrodes between the two substrates to cause a gas discharge, and display electrodes.

The plasma display device includes a chassis base that attaches to and supports the PDP, and a plurality of printed circuit board assemblies (PBAs) that drive the address electrodes and the display electrodes.

When the PDP displays an image, visible light is emitted concurrently with infrared rays. The infrared rays are emitted with a generally uniform dispersion from a display area where the image is displayed. The PDP typically shields the infrared rays by providing an infrared shield filter in the front substrate.

The above information disclosed in this Background section is only for an enhancement of understanding of the background of the invention and therefore it may contain information that does not form the prior art that is already known in this country to a person of ordinary skill in the art.

SUMMARY OF THE INVENTION

In one aspect, an exemplary embodiment according to the present invention provides a plasma display device having reduced cost that implements a touch panel function by utilizing infrared rays generated when displaying an image and emitted in a generally uniform dispersion from a display area.

According to an exemplary embodiment of the present invention, a plasma display device includes a plasma display panel (PDP) for displaying an image and an infrared sensor camera on either a front side or a rear side of the PDP for detecting a change in the amount of infrared rays emitted from the PDP. A controller determines a touch position corresponding to a position of the change in the amount of infrared rays, wherein the infrared sensor camera includes a lens having a view angle in the range of about 90° to 180°.

In some embodiments the view angle of the infrared sensor camera is in the range of about 94° to 110°.

In some embodiments, the focal distance of the infrared sensor camera is in the range of about 15 mm to 20 mm.

In some embodiments, the focal distance of the infrared sensor camera is in the range of about 16 mm to 20 mm.

The infrared sensor camera may be on the front side of the PDP.

The PDP generally includes a display area where the image is displayed and a non-display area where the image is not displayed at a periphery of the display area. The infrared sensor camera may include a first front side infrared sensor camera and a second front side infrared sensor camera that are disposed on the non-display area corresponding to two corners of the display area.

In some embodiments, the PDP has a rectangular shape that includes a pair of long sides, opposed to each other, and a pair of short sides, opposed to each other orthogonally to the long sides, wherein the first front side infrared sensor camera and the second front side infrared sensor camera may be provided on opposing ends of one of the long sides.

The infrared sensor camera may be provided at the rear of the PDP.

In some embodiments, the PDP includes a display area where the image is displayed and a non-display area where the image is not displayed at a periphery of the display area. The infrared sensor camera may include a first rear side infrared sensor camera and a second rear side infrared sensor camera that are on the non-display area corresponding to two corners of the display area.

The PDP in these embodiments may have a rectangular shape that includes a pair of long sides, opposed to each other, and a pair of short sides, opposed to each other orthogonal to the long sides, wherein the first rear side infrared sensor camera and the second rear side infrared sensor camera are provided on opposing ends of one of the short sides.

In some embodiments, the PDP includes a display area where the image is displayed and a non-display area where the image is not displayed at a periphery of the display area, wherein the infrared sensor camera includes a third infrared sensor camera and a fourth infrared sensor camera that are on the non-display area corresponding to diagonally opposed corners of the display area.

Figure 1:
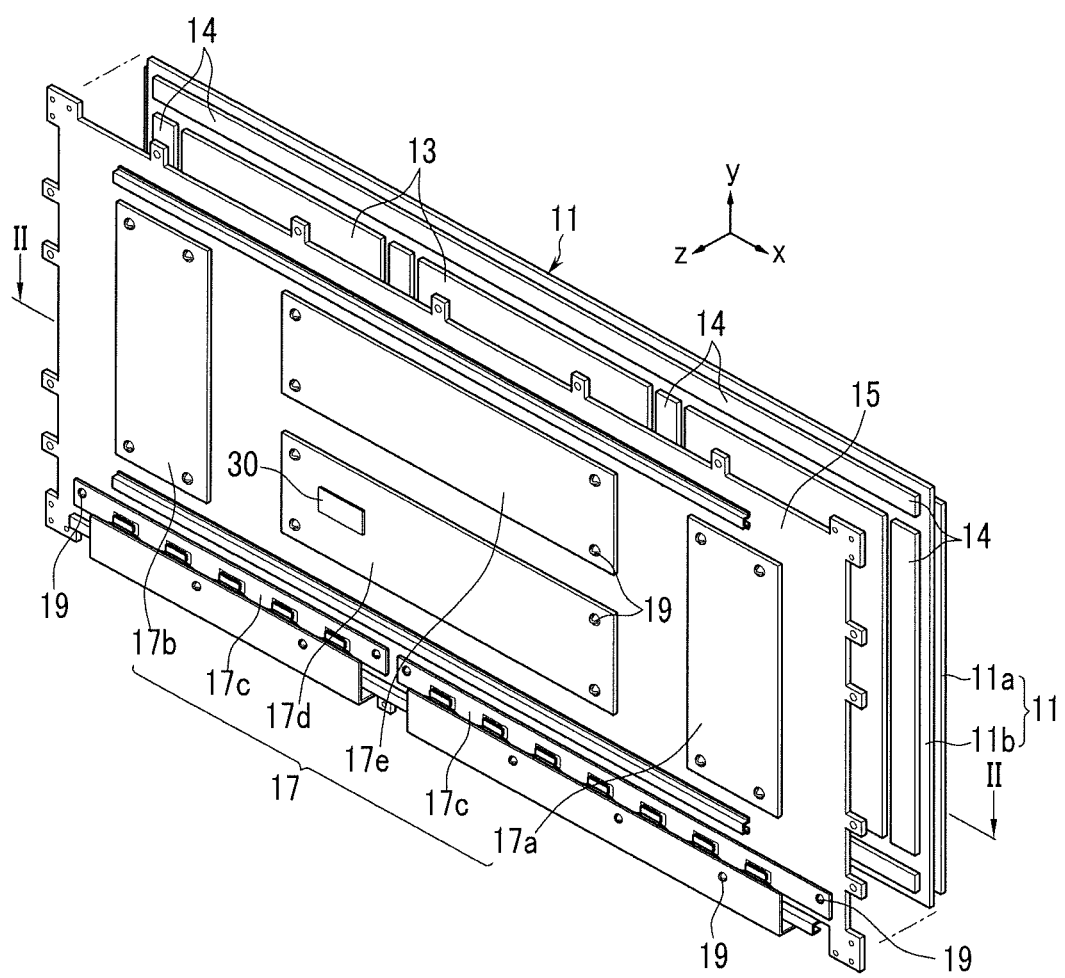
FIG. 1 is an exploded perspective view of a plasma display device according to a first exemplary embodiment of the present invention.

| Description of Reference Numerals Indicating Primary Elements in the Drawings | |
|---|---|
| 11: plasma display panel (PDP) | 11a: front substrate |
| 11b: rear substrate | 111: long side |
| 211: short side | 15, 35: chassis base |

-continued

Description of Reference Numerals Indicating
Primary Elements in the Drawings

| | |
|---|---|
| 17: printed circuit board assembly (PBA) | 17a: sustain board |
| 17b: scan board | 17c: address buffer board |
| 17d: logic board | 17e: power supply board |
| 20, 40, 50: infrared sensors | |
| 21, 22: first front side infrared sensor, second front side infrared sensor | |
| 30: controller | |
| 41, 42: first rear side infrared sensor, second rear side infrared sensor | |
| 51, 52: third infrared sensor, fourth infrared sensor | |
| DA: display area | ND: non-display area |
| PS: physical solid | |
| L1, L2, L3: first straight line distance, second straight line distance, third straight line distance | |
| φ, θ: first angle, second angle | |

DETAILED DESCRIPTION OF EXEMPLARY EMBODIMENTS

The present invention will be described more fully hereinafter with reference to the accompanying drawings, in which exemplary embodiments of the invention are shown, so that those skilled in the art to which the present invention pertains can easily carry out the present invention. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is an exploded perspective view of a plasma display device according to a first exemplary embodiment of the present invention.

Referring to FIG. 1, the plasma display device according to the first exemplary embodiment of the present invention includes a plasma display panel (PDP) 11, heat dissipation sheets 13, a chassis base 15 and printed circuit board assemblies (PBAs) 17.

The PDP 11 includes a front substrate 11a and a rear substrate 11b, and displays an image by utilizing a gas discharge generated between the two substrates 11a and 11b. The general constitution and function of the PDP 11 are well known to those of ordinary skill in the art, so a detailed description of its general constituent elements is omitted.

The first exemplary embodiment of the present invention relates to a plasma display device that determines a touch position by utilizing a change in the amount of emitted infrared rays according to whether a touch is made.

Figure 2:
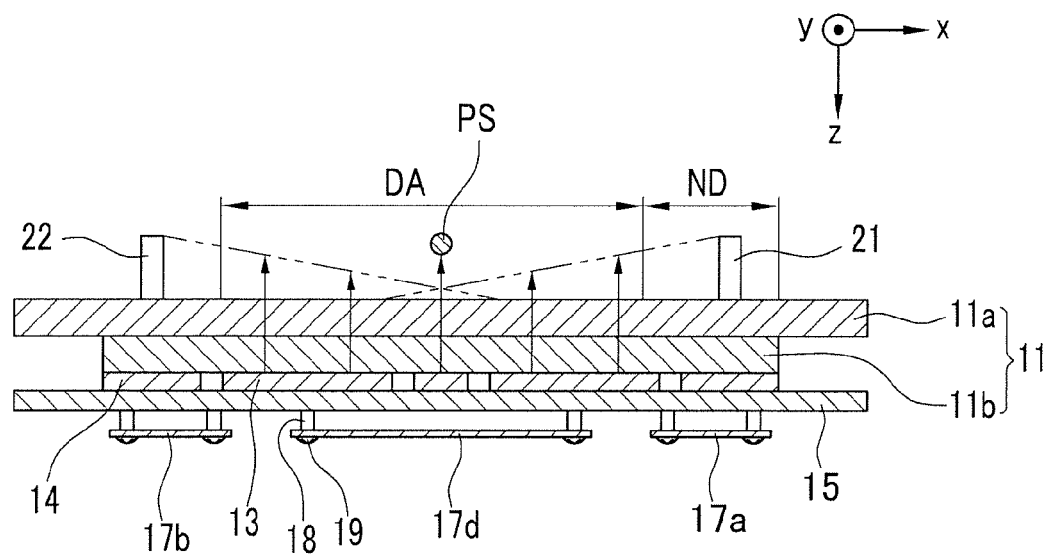
FIG. 2 is a cross-sectional view taken along the line II-II of FIG. 1.

FIG. 2 is a cross-sectional view taken along the line II-II of FIG. 1.

Referring to FIG. 2, the chassis base 15 is attached to a rear of the PDP 11 using a double-sided adhesive tape 14 to support the PDP 11.

The heat dissipation sheets 13 are secured between the PDP 11 and the chassis base 15 by the adherence of the double-sided adhesive tape 14.

The PBAs 17 are mounted on the rear of the chassis base 15 to be connected electrically to the PDP 11. The PBAs 17 are on a plurality of bosses 18 on the chassis base 15 and are fixed by the setscrews 19 engaged with the bosses 18.

The PBAs 17 according to one embodiment include a sustain board 17a that controls the sustain electrodes (not shown), a scan board 17b that controls the scan electrodes (not shown), and an address buffer board 17c that controls the address electrodes (not shown).

Also, the PBAs 17 include a logic board 17d that receives video signals from an external device and generates control signals for driving the address electrodes, the sustain electrodes and the scan electrodes, and applies the control signals to the corresponding PBAs, respectively, and a power supply board 17e that supplies power for driving the respective PBAs 17a, 17b, 17c, and 17d.

The PDP 11 of this embodiment displays an image according to the drive of the PBAs 17.

Figure 3:
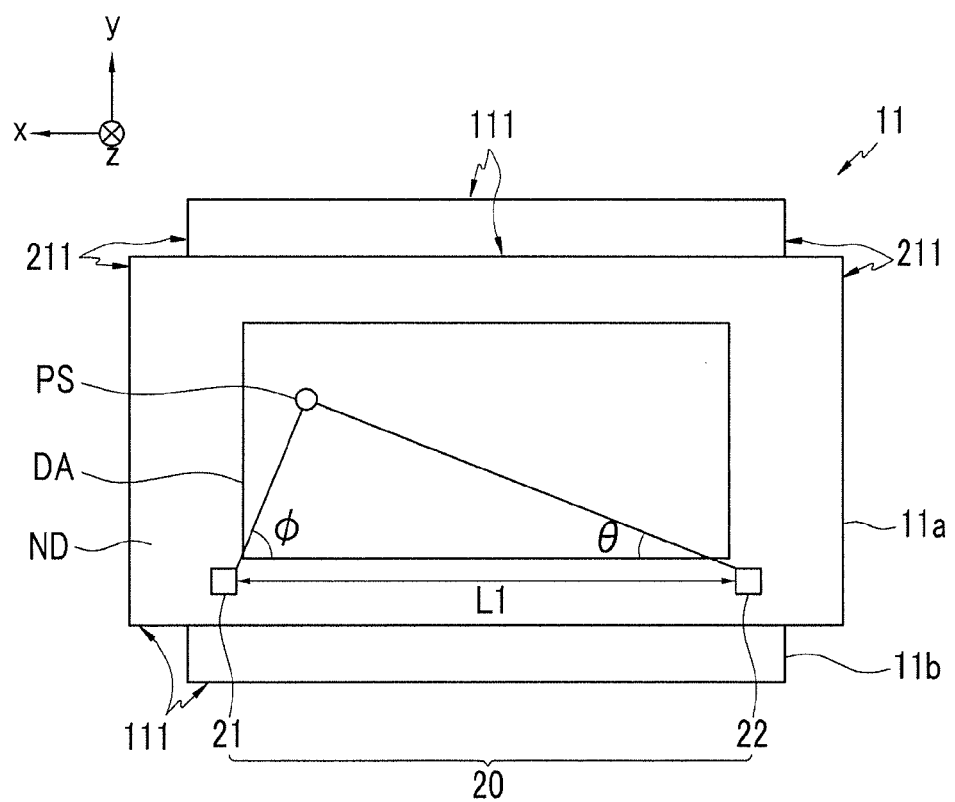
FIG. 3 is a front view of the plasma display panel (PDP) of FIG. 1.

FIG. 3 is a front view of the PDP 11 of FIG. 1.

Referring to FIG. 3, the PDP 11 includes a display area DA where the image is displayed, and a non-display area ND where the image is not displayed at a periphery of the display area DA.

Also, the PDP 11 is formed in a quadrangle (e.g., a rectangle shape) so that, in the display area, the PDP 11 has a pair of long sides 111, opposed to each other, and a pair of short sides 211, opposed to each other. The short side 211 may extend in a direction crossing to the long sides 111.

The infrared rays having a substantially uniform dispersion are emitted from the front surface of the display area DA while the image is displayed (see FIG. 2).

Also, although some infrared rays are emitted from the non-display area ND, the infrared rays emitted from the non-display area ND are not relevant to the present invention so that they will not be discussed.

The infrared rays (e.g., rays having a wavelength of about 800 nm to 1000 nm) are emitted from the front surface of the display area DA of the PDP 11.

Therefore, the PDP according to some embodiments shields the infrared rays emitted from the display area DA using an infrared shield filter (not shown).

However, the infrared rays emitted from the display area DA are not completely shielded by the infrared shield filter but are about 85% shielded, leaving about 15% of the infrared rays that are transmitted through the infrared shield filter.

Therefore, the present exemplary embodiment may be applied even when the infrared shield filter is applied.

The infrared rays are emitted from the front surface of the display area DA in a substantially uniform dispersion to reflect off of a physical solid (an object or a substance) PS positioned in front of the display area DA.

In this case, the amount of infrared rays is changed at the position of the physical solid PS.

If the change in the amount of infrared rays is detected, the corresponding touch position of the physical solid PS is determined on the display area DA.

Referring to FIG. 3 again, an infrared sensor (e.g., an infrared sensor camera) 20 is provided on the PDP 11 in order to detect the change in the amount of infrared rays emitted from the display area DA.

In the first exemplary embodiment, the infrared sensor camera 20 is provided in front of the PDP 11.

Therefore, the infrared sensor camera 20 detects the change in the amount of infrared rays emitted from the front surface of the display area and reflected from the physical solid PS in front of the display area DA.

The infrared sensor camera 20 continuously detects infrared rays, in order to detect changes (e.g., instantaneous changes) in the amount of infrared rays emitted from the PDP 11.

The continuous detection of infrared rays may be implemented in various forms known to those skilled in the art according to the preferences of individual designers, so a detailed explanation thereof will be omitted.

More specifically, in some embodiments the infrared sensor camera 20 is at one side (e.g., attached to a front surface) of the PDP 11.

When the device is completed by including the PDP 11, a front case and a rear case are provided on the front and the rear of the PDP 11, respectively, so that the infrared sensor camera 20 may also be attached to the front case (not shown).

If the infrared sensor camera 20 can detect the change in the amount of infrared rays emitted from the display area DA, the infrared sensor camera 20 may be attached to the PDP 11 or the front case.

For example, in some embodiments, two infrared sensor cameras 20 determine a touch position using two axes that are opposed to each other or intersected with each other.

In this case, the two detecting axes on which the infrared sensor cameras 20 are formed may be opposed to each other on a straight line or be intersected with each other on a plane. A point where the two detecting axes are opposed or intersected corresponds to a touch position.

Referring to FIG. 3, the infrared sensor camera 20 includes a first front side infrared sensor camera 21 and a second front side infrared sensor camera 22 that are disposed at the non-display area ND corresponding to opposing ends of quadrangular edges (e.g., corners) of the display area DA.

For example, in the illustrated embodiment, the first front side infrared sensor camera 21 and the second front side infrared sensor camera 22 are provided at respective ends of the lower long side 111 of the pair of long sides 111 (e.g., at the lower corners of the display area DA).

The first and second front side infrared sensors cameras 21 and 22 detect the change in the amount of infrared rays from the display area DA by utilizing a triangulation method from the two ends of the long side 111.

According to the triangulation method, a first straight line distance L1 between the first front side infrared sensor camera 21 and the second front side infrared sensor camera 22 is measured, a first angle φ of the first front side infrared sensor camera 21 and a second angle θ of the second front side infrared sensor camera 22 are measured with reference to the first straight line distance L1, and the point of intersection of lines representing the respective detection directions is determined to be a touch position.

In order to detect the touch position over the entire range of the display area DA using the two infrared sensor cameras 20, in the present exemplary embodiment, the infrared sensor cameras 20 respectively include a lens having a view angle of at least 90°, that is, the detecting range.

For example, in some embodiments the lens of the sensor camera 20 has the view angle in the range of 90° to 180°, and in some embodiments the lens of the sensor camera 20 has the focal distance in the range of 15 mm to 20 mm.

The view angle and the focal distance of the lens in the infrared sensor camera 20 according to various embodiments are represented by the following Table 1.

TABLE 1

Relation between focal distance and view angle of lens

| | Focal distance (mm) | | | | | | | |
|---|---|---|---|---|---|---|---|---|
| | 15 | 16 | 18 | 20 | 24 | 28 | 35 | 50 |
| View (°) angle | 180 | 110 | 100 | 94 | 81 | 74 | 62 | 46 |

Referring to Table 1, some embodiments utilize the lens of the infrared sensor camera 20 having a view angle in the range of 94° to 110°.

For these embodiments, the lens of the infrared sensor camera 20 has the focal distance in the range of 16 mm to 20 mm.

The first and second front side infrared sensor cameras 21 and 22 that have the lens having the view angle and the focal distance as described above enable the detection of touches over substantially the entire display area DA.

Compared to the case where four charge-coupled device (CCD) cameras having an image angle of 46°, or four complementary metal-oxide semiconductor (CMOS) cameras having an image angle of 58° are applied, if two infrared sensor cameras 20 are utilized, as shown in the present exemplary embodiment, costs are reduced.

The view angle of 94° for the first and second front side infrared sensor cameras 21 and 22 generates areas overlapped with each other compared to the view angle of 90°, thereby reducing the probability that any area of the display area DA will be omitted.

Also, the view angle of 110° in the first and second front side infrared sensor cameras 21 and 22 can prevent the overlapped area from being exceedingly broad, while not omitting portions of the display area DA, compared to the view angle of 180° therein.

Referring again to FIG. 1, the plasma display device in the first exemplary embodiment includes a controller 30.

The controller 30 receives detecting signals corresponding to the change in the amount of infrared rays detected and applied by the infrared sensor camera 20, and the position where the change in the amount of infrared rays occurs is determined to be a touch position.

For example, the controller 30 has built-in (e.g., predetermined) position data for the display area DA and compares the built-in position data with the position data where the change in the amount of the detected infrared rays occurs, making it possible to determine the touch position of the physical solid PS in the display area DA.

The controller 30 includes an electric circuit, and may have various different components according to design preferences, so a detailed explanation thereof will be omitted. That is, those skilled in the art would know how to design and build the controller 30 based on the disclosure herein.

The controller 30 may be provided in or on any one of the printed circuit board assemblies PBA 17. In the first exemplary embodiment, the controller 30 is provided in the logic board 17d.

The operation of a touch panel will be briefly explained. When the plasma display device is driven, infrared rays are emitted forward, together with visible light, from the front surface of the display area DA (see FIG. 2).

The infrared sensor camera 20 continuously detects the infrared rays emitted from the front surface of the display area DA.

At this time, if the physical solid PS is positioned in front of the display area DA, the infrared rays having a substantially uniform dispersion have a change in the amount thereof around the physical solid PS.

The infrared sensor camera 20 detects the change in the amount of infrared rays.

The detection signals corresponding to the change in the amount of infrared rays are transmitted to the controller 30 in the logic board 17d.

The controller 30 compares the built-in position data with the position data detected as having a change in the amount of infrared rays to determine the touch position of the physical solid PS on the display area DA.

Figure 4:
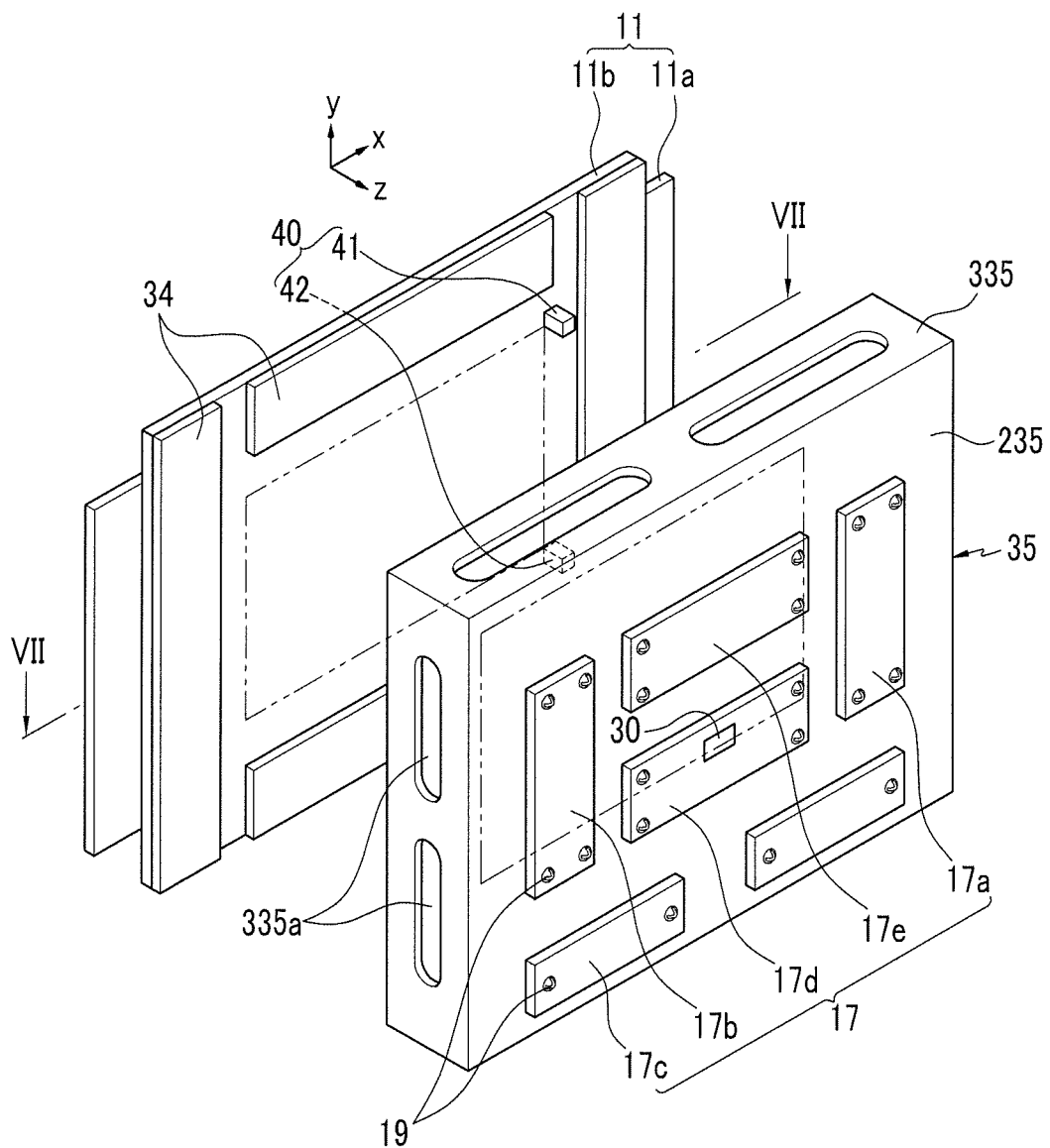
FIG. 4 is an exploded perspective view of a plasma display device according to a second exemplary embodiment of the present invention.

FIG. 4 is an exploded perspective view of a plasma display device according to a second exemplary embodiment of the present invention.

Here, comparing the second exemplary embodiment with the first exemplary embodiment, the different portions therebetween will be described, omitting the explanation of similar portions.

In the first exemplary embodiment, the infrared sensor camera 20 is provided at the front side of the PDP 11, but in the second exemplary embodiment, the infrared sensor camera 40 is provided at the rear side of the PDP 11.

In the first exemplary embodiment, the infrared sensor camera 20 detects a change in the amount of infrared rays at the front of the PDP 11, but in the second exemplary embodiment, the infrared sensor camera 40 detects a change in the amount of infrared rays at the rear of the PDP 11.

Therefore, in the first exemplary embodiment, the infrared sensor camera 20 and the controller 30 determine the touch position of the physical solid PS by detecting a change in the amount of infrared rays emitted from the front surface of the display area DA, but in the second exemplary embodiment, the infrared sensor camera 40 and the controller 30 determine the touch position of the physical solid PS by detecting a change in the amount of infrared rays reflected from the physical solid PS through the front surface of the display area DA to the back surface thereof to be emitted from the back surface.

Without the presence of the physical solid PS, infrared rays are emitted from the rear surface of the display area DA at a substantially uniform dispersion.

That is, although the amount of infrared rays emitted from the rear surface of the display area DA is less than the amount of infrared rays emitted from the front surface, it is similarly emitted having a substantially uniform dispersion.

Also, the infrared rays are reflected from the physical solid PS in front of the display area DA to the back to be emitted from the rear surface of the display area DA.

In this case, the change in the amount of infrared rays corresponds to the reflected position.

If the change in the amount of infrared rays is detected, the corresponding touch position of the physical solid PS can be determined on the display area DA.

Owing to the differences as described above, the second exemplary embodiment has a different constitution from the first exemplary embodiment.

As the infrared sensor camera 40 is provided on the rear side of the PDP 11, the chassis base 35 is formed differently from the chassis base 15 in the first exemplary embodiment.

Figure 5:
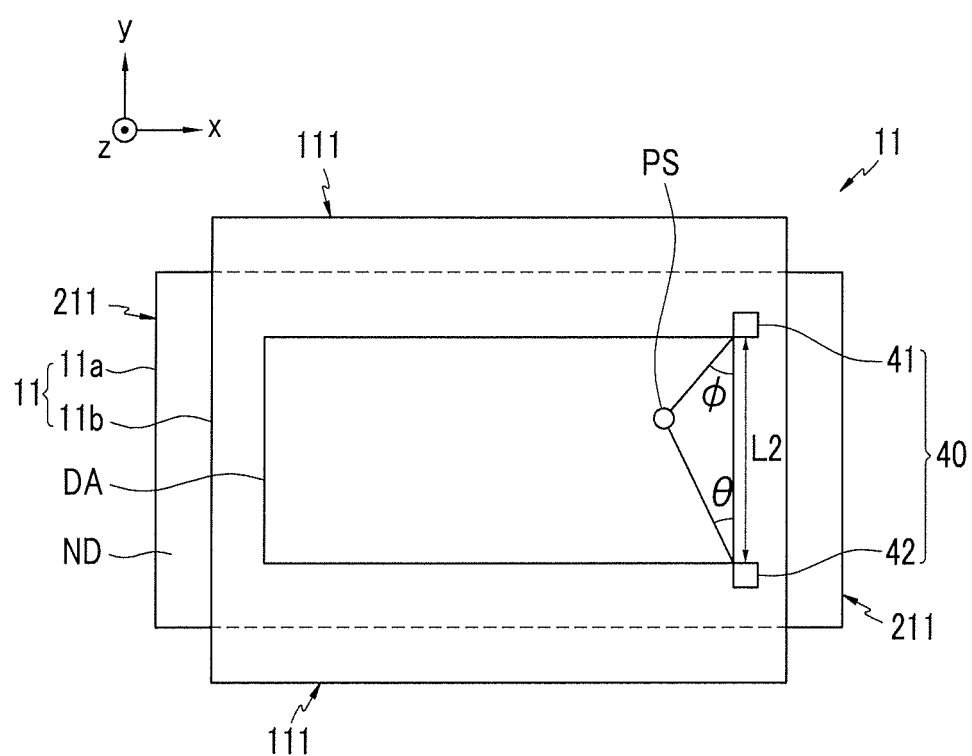
FIG. 5 is a rear view of the PDP of FIG. 4.

FIG. 5 is a rear view of the PDP 11 of FIG. 4.

Referring to FIG. 5, the infrared sensor camera 40 is attached to the rear side of the PDP 11.

If the infrared sensor camera 40 can detect the change in the amount of infrared rays in the rear of the display area DA by the infrared rays reflected from the physical solid PS in front of the display area DA to the back surface to be emitted from the back surface, it may be attached to the PDP 11 or the chassis base 35.

In some embodiments, the infrared sensor camera 40 includes two sensors (e.g., two infrared sensor cameras).

For example, the infrared sensor camera 40 includes a first rear side infrared sensor camera 41 and a second rear side infrared sensor camera 42 that are disposed on the non-display area ND corresponding to the two ends of quadrangular edges of the display area DA (e.g., at opposing corners on the short side of the display area DA), at the rear side of the PDP.

For example, the first rear side infrared sensor camera 41 and the second rear side infrared sensor camera 42 are provided at respective ends of the short side 211 on the right side of the pair of short sides 211 (see FIG. 5).

The first and second rear side infrared sensor cameras 41 and 42 detect the change in the amount of infrared rays in the display area DA by a triangulation method from the two ends of the short side 211.

According to the triangulation method, a second straight line distance L2 between the first rear side infrared sensor camera 41 and the second rear side infrared sensor camera 42 is measured, a first angle ϕ of the first rear side infrared sensor camera 41 and a second angle θ of the second rear side infrared sensor camera 42 are measured with reference to the first straight line distance L2, and the point of intersection is determined to correspond to a touch position.

Figure 7:
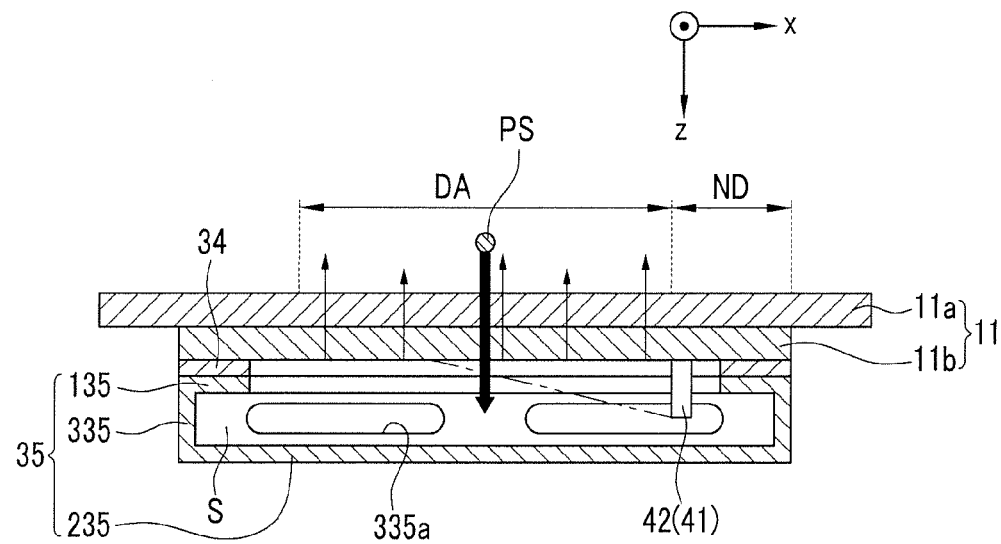
FIG. 7 is a cross-sectional view taken along the line VII-VII of FIG. 4.

Meanwhile, the chassis base 35 provides a space S for receiving the infrared sensor camera 40 between the PDP 11 and the chassis base 35 and for detecting a change in the amount of infrared rays (see FIG. 7).

Figure 6:
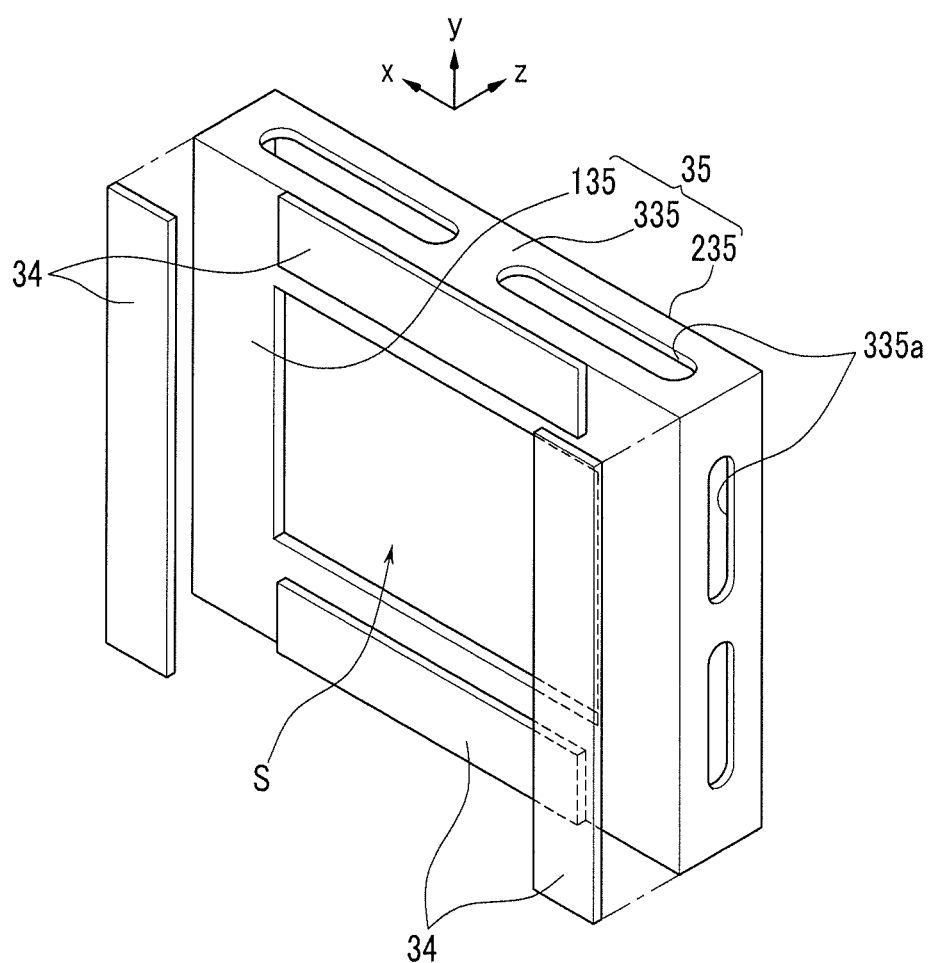
FIG. 6 is a front perspective view of a chassis base of FIG. 4.

FIG. 6 is a front perspective view of the chassis base 35 of FIG. 4.

Referring to FIG. 6, the chassis base 35 includes a first horizontal member 135, a second horizontal member 235 and a vertical member 335. The planes of the first and second horizontal member 135 and 235 are substantially parallel to the plane of PDP 11, and the vertical member 335 is perpendicular to the plane of the PDP 11.

The first horizontal member 135 is attached to the PDP 11, facing the pair of long sides 111 and the pair of short sides 211. The first horizontal member 135 is formed in a rectangular frame such that it is attached to substantially the entirety of the long sides 111 and the short sides 211.

The attachment area of the chassis base 35 and the PDP 11 is more limited in the second exemplary embodiment than in the first exemplary embodiment, due to the space S.

Under such a limited circumstance, the first horizontal member 135 should have a maximum possible attachment area.

The double-sided adhesive tape 34 is interposed between the chassis base 35 and the PDP 11 to attach them.

In other words, the double-sided adhesive tape 34 is interposed between the first horizontal member 135 and the pair of long sides 111, opposing to each other, and between the first horizontal member 135 and the pair of short sides 211, opposing to each other, respectively.

FIG. 7 is a cross-sectional view taken along the line VII-VII of FIG. 4.

Referring to FIG. 7, the second horizontal member 235 provides a mounting space of the printed circuit board assemblies PBA 17, in the same manner as the chassis base 15 in the first exemplary embodiment.

The vertical member 335 extends (e.g., is bent) from the first horizontal member 135 away from the PDP 11 to connect to the second horizontal member 235.

In other words, the chassis base 35 creates a space S between the first horizontal member 135 and the second horizontal member 235 according to the size of the vertical member 335.

As the first horizontal member 135 is attached to the PDP 11, some of the heat generated from the PDP 11 is discharged to the space S between the rear side of the PDP 11 and the second horizontal member 235 opposed thereto.

Thus, in some embodiments, the vertical member 335 includes at least one air vent hole 335a.

The air vent hole 335a connects the space S between the PDP 11 and the second horizontal member 235 to the outside.

The air vent hole 335a discharges some of the heat in the space S by turbulent air formed therethrough. Meanwhile, the infrared sensor cameras 20 and 40 applied to the first and second exemplary embodiments detect the change in the amount of infrared rays emitted from the front surface and the rear surface, respectively, of the display area DA.

Therefore, according to various other embodiments, if the change in the amount of infrared rays can be recognized, the infrared sensor cameras 20 and 40 may be replaced by other elements.

Figure 8:
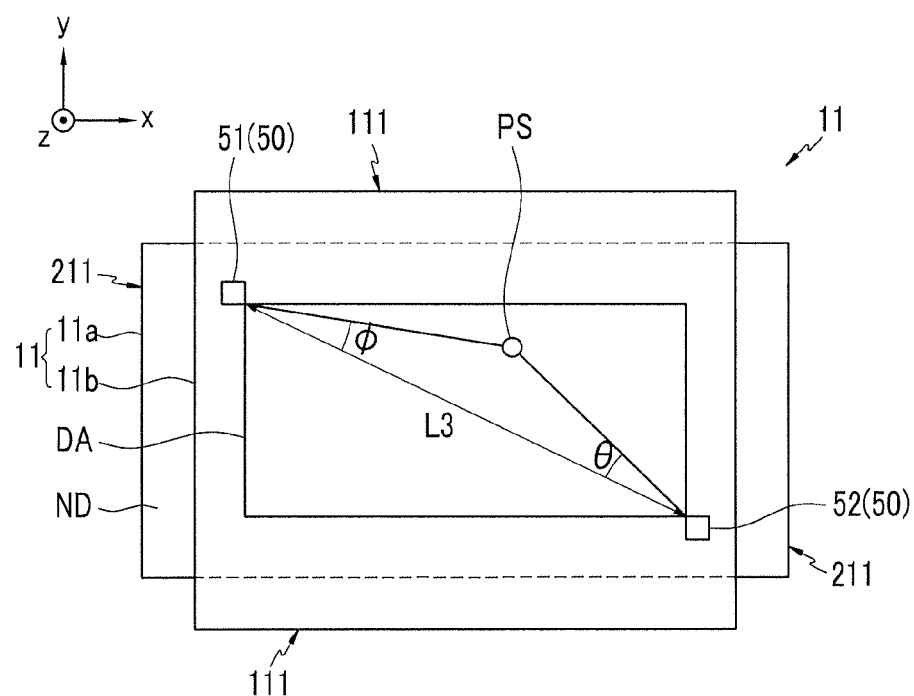
FIG. 8 is a rear view of a PDP in a plasma display device according to a third exemplary embodiment of the present invention.

FIG. 8 is a rear view of a PDP in a plasma display device according to a third exemplary embodiment of the present invention.

Here, comparing the first and second exemplary embodiments with the third exemplary embodiment, the different portions therebetween will be described, omitting the explanation of the similar portions. In the first and second exemplary embodiments, the infrared sensor cameras 20 and 40 are provided corresponding to both ends of a long side 111 of the PDP 11 (e.g., the corners at the top or the bottom of FIG. 8) or corresponding to both ends of a short side 211 thereof (e.g., the corners at the left or right of FIG. 8).

Compared thereto, in the third exemplary embodiment, an infrared sensor 50 is disposed in the non-display area ND corresponding to the two ends of the quadrangular edges of the PDP 11, diagonally disposed (e.g., at diagonally opposed corners of the display area DA).

Also, the infrared sensor camera 50 in the third exemplary embodiment may be disposed at the diagonal corners in front of the PDP 11 (not shown) as in the first exemplary embodiment, and may be disposed at the diagonal corners at the rear of the PDP 11 as in the second exemplary embodiment.

For convenience of description, the third exemplary embodiment shows the structure where the infrared sensor camera 50 is provided at the rear of the PDP 11 as shown in FIG. 8.

Referring to FIG. 8, the infrared sensor cameras 50 are attached to the diagonally opposed corners of the rear side of the PDP 11 to detect the change in the amount of infrared rays at the rear of the display area DA by the infrared rays reflected from the physical solid PS in front of the display area DA to the back surface. and emitted from the back surface.

For example, the infrared sensor camera 50 includes a third infrared sensor camera 51 and a fourth infrared sensor camera 52 that are disposed on the non-display area ND corresponding to two diagonally opposed corners of the display area DA, at the rear side of the PDP 11.

The third and fourth infrared sensor cameras 51 and 52 detect a change in the amount of infrared rays from the display area DA by a triangulation method from the two diagonally opposed corners.

According to the triangulation method, a third straight line distance L3 between the third infrared sensor camera 51 and the fourth infrared sensor camera 52 is measured, a first angle φ of the third infrared sensor camera 51 and a second angle θ of the fourth infrared sensor camera 52 are measured with reference to the third straight line distance L3, and the intersected point is determined to correspond to a touch position.

According to various embodiments of the present invention, the infrared sensor camera 40 is installed on the front side or the rear side of the PDP 11 and the lens provided in the infrared sensor 40 camera has a view angle in the range of about 90° to 180° so that the number of the infrared sensor cameras is reduced in implementing the touch panel function using infrared rays, thereby making it possible to reduce costs.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A plasma display device, comprising:
   a plasma display panel (PDP) for displaying an image;
   an infrared sensor camera on a front side or a rear side of the plasma display device for detecting a change in an amount of infrared rays emitted from a display area of the PDP; and
   a controller for determining a touch position corresponding to a position of the change in the amount of infrared rays emitted from the display area of the PDP,
   wherein the infrared sensor camera comprises a lens having a view angle in a range of about 90° to 180°.

2. The plasma display device of claim 1, wherein a focal distance of the infrared sensor camera is in a range of about 16 mm to 20 mm.

3. The plasma display device of claim 1, wherein the infrared sensor camera has a focal distance in a range of about 15 mm to 20 mm.

4. The plasma display device of claim 3, wherein the infrared sensor camera is on the front side of the PDP.

5. The plasma display device of claim 4, wherein the PDP comprises:
   the display area where the image is displayed; and
   a non-display area where the image is not displayed, the non-display area at a periphery of the display area,
   wherein the infrared sensor camera comprises a first front side infrared sensor camera and a second front side infrared sensor camera on the non-display area corresponding to two corners of the display area.

6. The plasma display device of claim 5, wherein the PDP has a rectangular shape having a pair of long sides, opposed to each other, and a pair of short sides, opposed to each other orthogonally to the long sides,
   wherein the first front side infrared sensor camera and the second front side infrared sensor camera are at opposing ends of one of the long sides.

7. The plasma display device of claim 6, further comprising a chassis base attached to the rear side of the PDP for supporting the PDP.

8. The plasma display device of claim 3, further comprising a chassis base attached to the rear side of the PDP for supporting the PDP, wherein the infrared sensor is at the rear side of the PDP.

9. The plasma display device of claim 8, wherein the PDP comprises:
   the display area for displaying the image; and
   a non-display area where the image is not displayed, the non-display area at a periphery of the display area,
   wherein the infrared sensor camera comprises a first rear side infrared sensor camera and a second rear side infrared sensor camera on the non-display area corresponding to two corners of the display area.

10. The plasma display device of claim 9, wherein the PDP has a rectangular shape having a pair of long sides, opposed to each other, and a pair of short sides, opposed to each other orthogonally to the long sides,
   wherein the first rear side infrared sensor camera and the second rear side infrared sensor camera are at opposing ends of one of the short sides.

11. The plasma display device of claim 10, wherein the chassis base comprises:
a first horizontal member attached to the PDP;
a second horizontal member for attaching an electronic circuit board;
a vertical member between the first horizontal member and a second horizontal member, for providing a space between the first horizontal member and the second horizontal member,
wherein the infrared sensor camera is in the space.

12. The plasma display device of claim 11, wherein the vertical member comprises an air vent hole for venting heat from the space.

13. The plasma display device of claim 3, wherein the PDP comprises:
the display area for displaying the image; and
a non-display area where the image is not displayed, the non-display area at a periphery of the display area,
wherein the infrared sensor camera comprises a third infrared sensor camera and a fourth infrared sensor camera on the non-display area corresponding to diagonally opposed corners of the PDP.

14. The plasma display device of claim 1, wherein the view angle of the infrared sensor camera is in a range of about 94° to 110°.

15. A plasma display device comprising:
a plasma display panel (PDP) for displaying an image; and
a pair of infrared sensor cameras at respective corners of the PDP, the infrared sensor cameras having view angles of at least 90°; and
a controller for determining a touch position where an object touches the PDP according to a change in an amount of infrared rays emitted from a display area of the PDP,
wherein the touch position corresponds to an intersection of lines representing respective detection directions corresponding to the respective infrared cameras.

16. The plasma display device of claim 15, wherein the controller is configured to compare data from the infrared sensor cameras corresponding to the intersection of the lines to predetermined data to determine the touch position.

17. The plasma display device of claim 15, wherein the pair of infrared sensor cameras are at a front side of the PDP, and are configured to detect a change in the amount of infrared rays at a front surface of the PDP corresponding to the touch position of the object.

18. The plasma display device of claim 15, wherein the pair of infrared sensor cameras are at a rear side of the PDP, and are configured to detect a change in the amount of infrared rays passing from a front surface of the PDP through the PDP and emitted from a rear surface of the PDP, at a location corresponding to the touch position of the object.

* * * * *